United States Patent [19]

Sato et al.

[11] Patent Number: 4,573,780

[45] Date of Patent: Mar. 4, 1986

[54] PHOTOGRAPHIC RECORDING DEVICE FOR VIDEO IMAGE

[75] Inventors: Susumu Sato; Hideharu Oshima, both of Saitama, Japan

[73] Assignee: Fuji Photo Optical Co., Ltd., Saitama, Japan

[21] Appl. No.: 683,525

[22] Filed: Dec. 19, 1984

[30] Foreign Application Priority Data

Dec. 28, 1983 [JP] Japan .................. 58-245092

[51] Int. Cl.$^4$ .................. G03B 3/00; G03B 29/00
[52] U.S. Cl. .................. 354/195.12; 354/76
[58] Field of Search .............. 354/76, 77, 195.12; 355/55, 56

[56] References Cited

U.S. PATENT DOCUMENTS

| | | | |
|---|---|---|---|
| 4,027,968 | 6/1977 | Spence-Bate | 354/195.12 X |
| 4,119,983 | 10/1978 | Tanaka | 354/195.12 |
| 4,131,353 | 12/1978 | Engelsmann | 354/195.12 |
| 4,451,129 | 5/1984 | Ikari et al. | 354/195.12 |

Primary Examiner—William B. Perkey
Attorney, Agent, or Firm—Sughrue, Mion, Zinn, Macpeak, and Seas

[57] ABSTRACT

A photographic recording device such as may be used for recording images displayed on a cathode-ray tube screen on photographic film in which lenses of different focal length can alternatively be disposed in an optical path between the cathode-ray tube screen and the film. First and second lenses are mounted at ends of respective first and second lens arms. The lens arms are attached to a rotatable shaft with a vertical clearance and a predetermined angle therebetween. Rotary power from a motor is conveyed to the rotary drive shaft via a crank mechanism to cause a reciprocal swinging movement of the two lens arms. A snap spring biases the lens arms in either direction selectively. First and second stops determine the extent of the swinging movement to stably hold the lens arms so as to position the optical axes of the respective first and second lenses in alignment with the optical path of the recording device.

6 Claims, 7 Drawing Figures

PHOTOGRAPHIC RECORDING DEVICE FOR VIDEO IMAGE

BACKGROUND OF THE INVENTION

The present invention relates to an improved photographic recording device for recording, on a photosensitive recording medium in the form of a film, video images obtained from a CT (Computer Tomograph) apparatus, a NMR (Nuclear Magnetic Resonance) apparatus, an ultrasonic diagnosis apparatus, or the like displayed on a CRT (Cathode-Ray Tube) screen. More particularly, the invention relates to an improvement in such a device which includes a pair of lenses having different focal lengths and which are alternating disposed in an optical path.

In such a device as mentioned above, the lens system must have an optical axis which coincides with the optical path of the device. In switching between lenses, the optical axis of the lens disposed in the optical path must always be made to coincide with the center axis of the optical path of the recording device. In order to realize such coincidence between the optical axes of the lenses and the optical path of the optical system of the recording device, a precisely machined and precisely assembled lens switching mechanism and/or servo mechanism has heretofore been required, which is disadvantageous in view of manufacturing cost.

SUMMARY OF THE INVENTION

It is an object of the present invention to provide a photographic recording device for recording, on a photosensitive recording medium, video images on a CRT display, which is capable of alternatingly positioning the lenses with a high accuracy and which has a simple and inexpensive construction.

According to the present invention, the above object is achieved by a photographic recording device comprising first and second lens arms respectively mounting, at first ends thereof, two lenses, of different focal lengths, the other ends thereof being fixedly secured to a common rotatable shaft extending parallel to the optical path of the device with a predetermined angle and distance therebetween along the shaft, a crank mechanism having an idling gap, one of the lens arms being connected through the crank mechanism to a driving motor, a snap action spring mounted between the other of the lens arms and a stationary pin, and stops for establishing end points of movements of the lens arms at which the optical axes of the lenses coincide with the axis of the optical path of the device.

DESCRIPTION OF THE PREFERRED EMBODIMENTS

Figure 1:
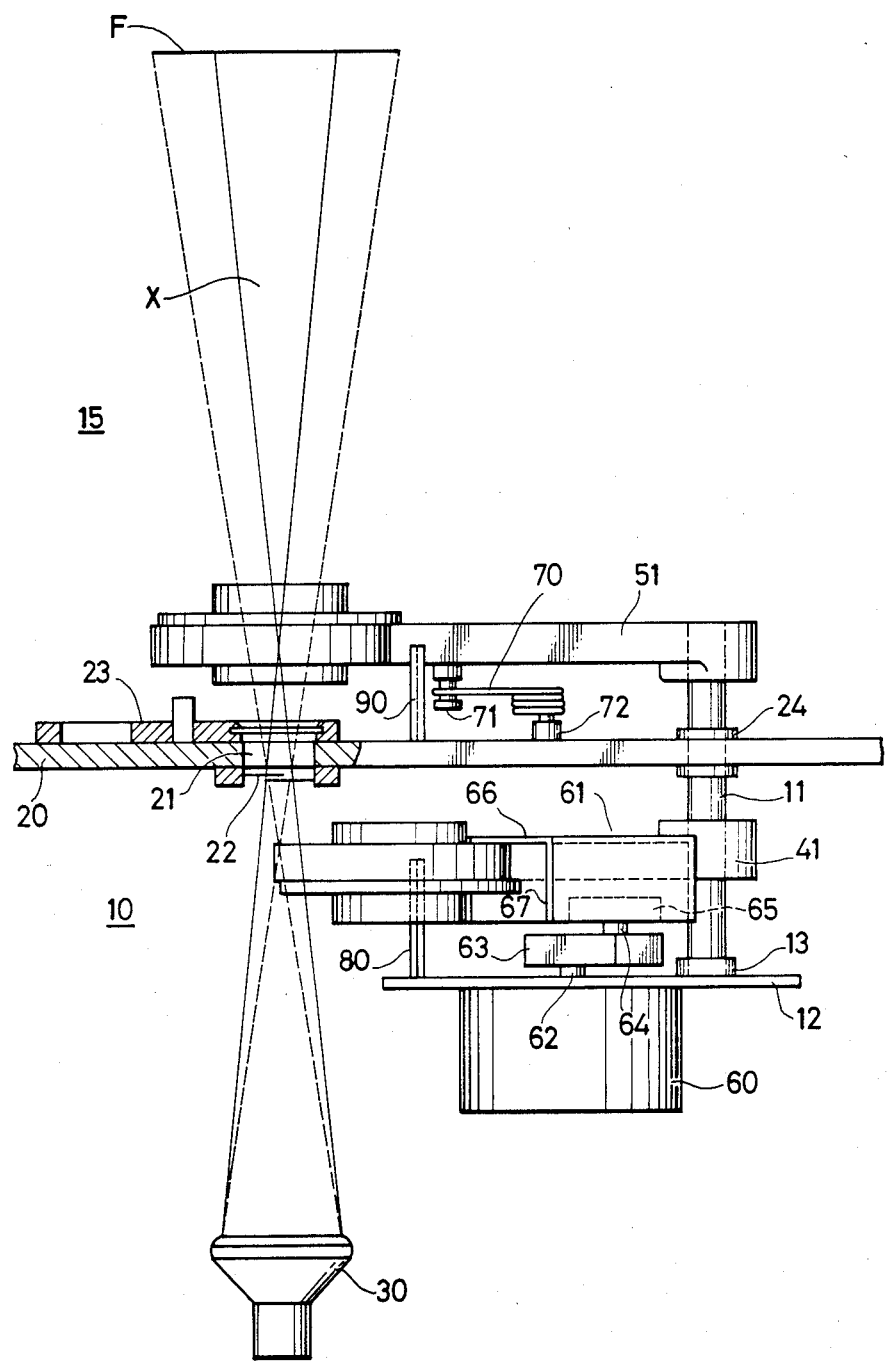
FIG. 1 is a partially cut away side elevation view of a main portion of a preferred embodiment of a recording device of the present invention.
Figure 2:
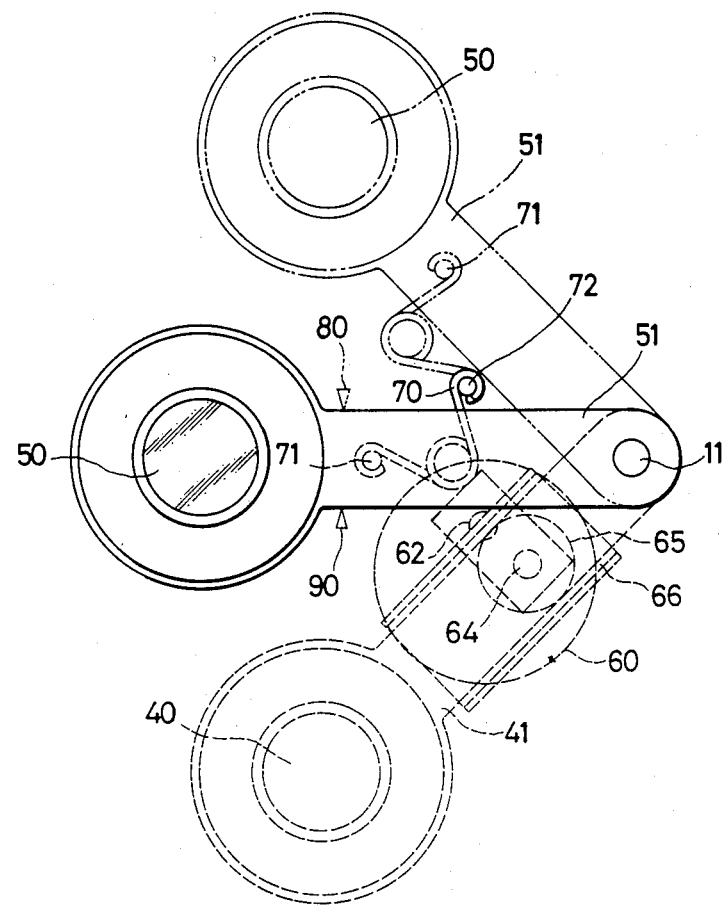
FIG. 2 is a plan view of the main portion shown in FIG. 1.

The present invention will now be described more specifically with reference to the drawings.

in FIG. 1, which shows a partially cut-away side elevational view of a main portion of a preferred embodiment of a recording device the present invention, and FIG. 2, which is a plan view of the main portion shown in FIG. 1, a photographic recording device according to the present invention includes a first chamber 10 and a second chamber 15 separated from each other by a light-shielding partition wall 20. In the first chamber 10, a CRT display unit 30 is disposed. In the second chamber 15, a photosensitive recording medium, for example, a monochromatic or color photosensitive film F, is disposed at a predetermined position. The light-shielding partition wall 20 has an opening 21 through which passes a photographing optical path X.

A shutter 22 is disposed substantially at one end portion of the opening 21 on the side of the first chamber 10, and a filter support disc 23 is rotatably mounted on the side of the second chamber 15.

The disc 23 is formed peripherally with a plurality of openings, each supporting a different filter member. Any one of the filters can be positioned in the optional path X by rotating the disc 23. Two lenses 40 and 50 of different focal lengths are disposed in the chambers 10 and 15, respectively, such that they can be inserted alternatively in the optical path X.

The lens 40 is secured at a top end of a lens arm 41 disposed in the chamber 10, while the lens 50 is secured at a top end of a lens arm 51. Respective rear ends of the lens arms 41 and 51 are fixedly secured to a connecting shaft 11 which penetrates the partition wall 20 and extends parallel to the optical path X and which is rotatably supported by a bearing 13 disposed on a support member 12 provided in the first chamber 10 and a bearing 24 disposed on the light-shielding partition wall 20. The arms 41 and 51 are on the connecting shaft 11 with a vertical gap therebetween, and a fixed angle is established between the arms 41 and 51. While the fixed angle between the lens arms 41 and 51 is illustrated as 45° in the drawing, a different angle may be used as desired. In any event, when one of the lens arms, for instance, the arm 41, is rotated in either direction, the other lens arm (51) is also rotated in the same direction.

The lens arm 41 is connected through a crank mechanism 61 to a drive motor 60 equipped with a reduction gear mechanism. The crank mechanism 61 is composed of a crank arm 63 secured to an output shaft 62 of the drive motor 60, a crank pin 64 fixed to the crank arm 63, an idler roller 65 rotatably mounted on the crank pin 64, and a driven guide member 66 of a U-shaped cross section. The driven guide member 66 is secured to the lens arm 41 and engaged with the idler roller 65. The diameter of the idler roller 65 is selected as smaller than an inner width of the driven guide member 66 so that gaps 68 are formed between the idler roller 65 and side walls 67 of the driven guide member 66. (See FIG. 4.)

Figure 7:
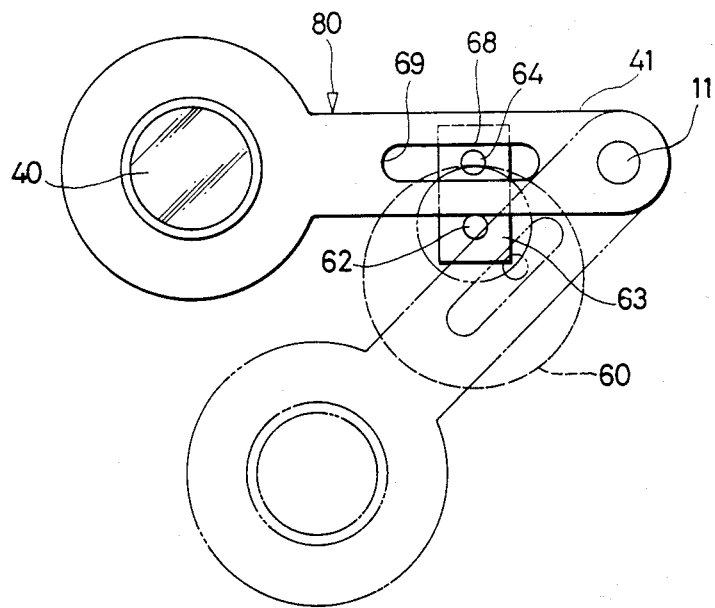
FIG. 7 is a plan view of another embodiment of a crank mechanism constructed according to the present invention.

Instead of the idler roller 65 mounted on the crank pin 64 and the driven guide member 66 secured to the lens arm 41, it is possible to construct the mechanism such that the crank pin 64 is engaged with a driven guide groove 69 formed in the lens arm 41, with gaps 68 being formed on both sides of the pin, as shown in FIG. 7.

Figure 3:
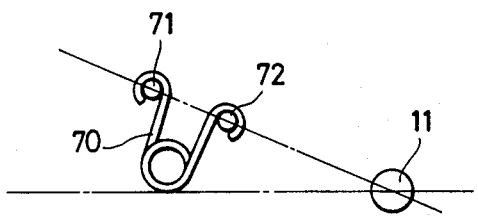
FIG. 3 is a view illustrating the operation of the snap action spring shown in FIG. 1.

In order to align the optical axis of the lens 40 or 50 with the axis of the optical path X of the device irrespective of the presence of the gaps 68, a snap action spring 70 is provided which has one end retained rotatably by a spring retaining protrusion 71 formed on the lens arm 51 and the other end retained rotatably by a spring retaining protrusion 72 formed on the light-shielding partition wall 20, as shown in FIGS. 1 and 3. The height of the protrusion 72 is selected so as to not hinder the rotation of the lens arm 51, and the position thereof is selected such that the snap spring 70 biases the lens arms 51 in either direction.

A stop 80 is provided on a support member 12 within the first chamber 10 shown in FIG. 1 which is adapted to limit the couterclockwise rotation of the lens arm 41 so that the lens arm 41 is held in a position where the optical axis of the lens 40 supported thereby is aligned with that of the optical path X of the device as shown in FIG. 1. Another stop 90 is provided on the light shielding partition wall 20 in the second chamber 15 which is adapted to limit the clockwise rotation of the lens arm 51 so that the latter is held in a position where the optical axis of the lens 50 supported thereby is aligned with the axis of the optical path X as shown in FIG. 1. The positions of the stops 80 and 90 may be made adjustable so that the stopped position of the respective lens arms 41 and 51 can be adjusted.

In order to record video images displayed on a CRT 30 on a photosensitive recording device constructed as described above, the lens 40 or 50 is introduced into the optical path X while aligning a light window of the filter support disc 23 in which a filter may be disposed with the opening 21, as shown in FIG. 1. In FIG. 1, the lens 50 is is inserted into the optical path X and the image on the CRT 30 is recorded on the medium F with a magnification ratio of 1. In this state, the lens 40 is positioned out of the optical path X, as shown by the dotted lines in FIG. 2, with the snap spring 70 taking the position shown by the solid line to bias the lens arm 51 in the counterclockwise direction around the shaft 11 until the arm 51 abuts the stop 90 previously adjusted so that the axis of the lens 50 is aligned with the axis of the optical path X. The stop 80 is previously adjusted in the same manner so that the axis of the lens 40 is aligned with the optical axis of the optical path X.

Figure 4:
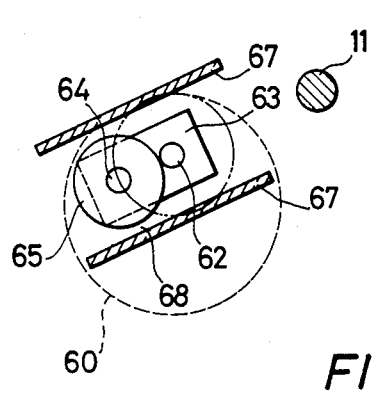
FIG. 4 through FIG. 6 are illustrative views of the operation of the snap spring.
Figure 5:
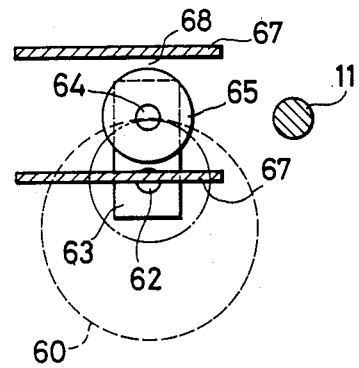
Figure 6:
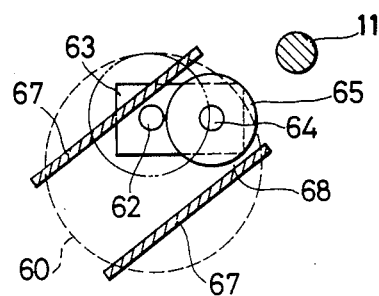

The lenses are alternated by operation of the drive motor 60. In the state shown in FIGS. 1 and 2, when a power switch (not shown) of the drive motor 60 is turned on, the output shaft 62 thereof is rotated in either direction, say, clockwisely as shown in FIGS. 4 through 6, and the crank arm 63 fixedly secured to the shaft 62, the crank pin 64 fixed to the crank arm 63 and the roller 65 mounted on the pin 64 are brought together from the state shown in FIG. 2 through the states shown in FIGS. 4 and 5 to the state shown in FIG. 6. In this instance, the guide member 67, and hence the lens arm 41, is rotated from the position shown by dotted lines in FIG. 2 to the position shown by solid lines in FIG. 6 due to engagement between the roller 65 and the guide member 66. Finally, the lens arm 41 is brought to the position shown in FIG. 7. Simultaneously, the lens arm 51 fixedly connected to the shaft 11 is rotated from the position shown by solid lines to the position shown by chain lines in FIG. 2. During the movement of the lens arm 51 out from the optical path X, the resilient force of the snap spring 70 becomes a maximum when the protrusion 71 on the lens arm 51 reaches a position on a straight line connecting the shaft 11 and the protrusion 72 secured to the light-shielding partition wall 20 (as shown in FIG. 3), and the snap action of the spring 70 is provided at the neutral position shown in FIG. 3.

When the roller 65 arrives at the position shown in FIG. 5, the lens arm 41 abuts against the stop 80 and the axis of the lens 40 is accurately aligned with the axis of the optical path X as shown in FIG. 7.

By turning the switch of the drive motor 60 off upon attaining this state, the switching of the lens is completed. This state is shown by chain lines in FIG. 2, in which the lens arm 51, and hence the shaft 11, are biased in the clockwise direction by the resilient force of the snap spring 70 and the lens arm 41 is also biased clockwise by the clockwise-biased shaft 11 to abut the stop 80.

If the optical axis of the lens thus switched does not coincide with the axis of the optical path X, the axis of the lens can be accurately aligned with the axis of the optical path X by finely adjusting the position of the corresponding stop within the range of the gap 68 provided between the guide member 66 and the roller 65.

When it is desired to change lenses, for instance, to change from the lens 40 to the other lens 50, the switch of the drive motor 60 is turned on again. The crank arm 63, the crank pin 64, the roller 65 and the side walls 67 of the guide member 66 turn from the position shown in FIG. 2 in sequence. Upon turning off the switch of the drive motor 60, the switching of the lens 40 to the lens 50 is completed. The lens can be accurately set in the optical path X in the same manner.

As is clear from the foregoing, according to the present invention, first ends of two lens arms supporting, at the other ends, lenses of different focal lengths are fixed to a common shaft with a predetermined angle and vertical distance therebetween. The shaft is rotatable and extends parallel to the optical path. One of the lens arms is connected through the crank mechanism to the drive motor such that the lens arm is rotated reciprocatingly within a predetermined angle. Therefore, switching from one lens to the other can be performed by a single unidirectional motor. Further, since the gaps are provided in the crank mechanism and separate adjustable stops are provided for the respective lens arms to make the axis of each lens coincide with the axis of the optical path of the device, adjustment of the position of the lens arms is facilitated and the axes of the lenses can be accurately aligned with the axis of the optical path.

Furthermore, since it is not necessary to stop the motor to precisely position the lens arm at an exact position, the motor need only rotate one of the lens arms such that the shaft connected thereto rotates to such an extent that the other arm rotates beyond the snap point of the snap spring. Precise positioning of the lens arms is obtained by the use of the spring and the stop. The overall construction of the device is thus made simple and the manufacture of the crank mechanism and the motor facilitated.

We claim:

1. A photographic recording device of a type having first and second lenses of different focal lengths and alternatively insertable into an optical path of said device for recording, on a photosensitive recording medium, video images displayed on a CRT device, comprising: first and second lens arms supporting at first ends thereof said first and second lenses, respectively; a rotatable shaft, second ends of said first and second lens arms being fixedly secured to said rotatable shaft with a vertical clearance therebetween and with a predetermined angle therebetween; rotary drive means; means for converting rotary movement of said rotary drive means into reciprocal swinging movement of said first and second lens arms; a snap spring for biasing said first and second lens arms in either direction selectively; first stop means for limiting swinging movement of said first lens arm in one direction to stably hold against a biasing force of said snap spring in said one direction said first lens in a position where an optical axis of said first lens aligns with an optical path of said recording device; and second stop means for limiting swinging movement of said second lens arm in the opposite direction to stably hold against a biasing force of said snap spring in said opposite direction said second lens arm in a position where an optical axis of said second lens aligns with said optical path of said recording device.

2. The photographic recording device of claim 1, further comprising a partition wall, said first and second lens arms being disposed on opposite sides of said partition wall and extending substantially parallel thereto, said rotatable shaft being rotatably supported on said partition wall.

3. The photographic recording device of claim 1, wherein said rotary movement converting means comprises a crank mechanism comprising a crank arm secured to the output shaft of said rotary drive means, a crank pin fixed to said crank arm, an idler roller mounted on said crank pin, and a driven guide member, said driven guide member being secured to said first lens arm and being engaged with said idler roller.

4. The photographic recording device of claim 1, wherein said rotary movement converting means comprises a crank mechanism, said crank mechanism comprising a crank arm secured to an output shaft of said rotary drive means, and a crank pin fixed to said crank arm and extending through a guide groove formed in said first lens arm, said guide groove extending longitudinally along said first lens arm and having a gap on both sides of said crank pin.

5. The photographic recording device of claim 2, wherein one end of said snap spring is connected to a center portion of one of said first and second lens arms, and the other end of said snap spring is connected to the partition wall.

6. The photographic recording device of claim 2, further comprising a filter support disk rotatably supported on said partition wall, said filter support disk carrying a plurality of different filters, and said filter support disk being rotatable to dispose a selected one of said filters in said optical path.

* * * * *

UNITED STATES PATENT AND TRADEMARK OFFICE
CERTIFICATE OF CORRECTION

PATENT NO. : 4,573,780
DATED    : 3/4/86
INVENTOR(S) : Susumu Sato, Hideharu Oshima It is certified that error appears in the above-identified patent and that said Letters Patent is hereby corrected as shown below:

Assignee should read as follows:  --Fuji Photo Film Co., Ltd.--.

Signed and Sealed this
Fourteenth Day of October, 1986

[SEAL]

*Attest:*

DONALD J. QUIGG

*Attesting Officer*    *Commissioner of Patents and Trademarks*